United States Patent [19]
Parker et al.

[11] Patent Number: 4,556,938
[45] Date of Patent: Dec. 3, 1985

[54] MICROCODE CONTROL MECHANISM UTILIZING PROGRAMMABLE MICROCODE REPEAT COUNTER

[75] Inventors: Tony E. Parker; Gerard A. Veneski, both of Boca Raton, Fla.

[73] Assignee: International Business Machines Corp., Purchase, N.Y.

[21] Appl. No.: 350,682

[22] Filed: Feb. 22, 1982

[51] Int. Cl.[4] .............................................. G06F 9/22
[52] U.S. Cl. .................................................. 364/200
[58] Field of Search ............................... 364/200, 900

[56] References Cited
U.S. PATENT DOCUMENTS

| | | | |
|---|---|---|---|
| 3,736,567 | 5/1973 | Lotan et al. | 340/172.5 |
| 4,156,900 | 5/1979 | Gruno et al. | 364/200 |
| 4,254,461 | 3/1981 | Chemla et al. | 364/200 |
| 4,371,931 | 2/1983 | Catiller et al. | 364/200 |
| 4,394,736 | 7/1983 | Bernstein et al. | 364/200 |
| 4,398,244 | 8/1983 | Chu et al. | 364/200 |
| 4,399,505 | 8/1983 | Druke et al. | 364/200 |
| 4,450,525 | 5/1984 | Demuth et al. | 364/200 |

FOREIGN PATENT DOCUMENTS
2349177 11/1977 France.

OTHER PUBLICATIONS
Mano, M. Morris, *Digital Logic and Computer Design,* Prentice Hall, Inc., Englewood Cliffs, NJ, 1979, pp. 189-195.

Manning et al., IBM Technical Disclosure Bulletin, Nov. 1979, pp. 2440-2441.
Adams et al., Electronics, Aug. 17, 1978, pp. 96-102.
Cook et al., IEEE Journal of Solid-State Circuits, Oct. 1979, pp. 833-840.

*Primary Examiner*—Gareth D. Shaw
*Assistant Examiner*—Melinda B. Thaler
*Attorney, Agent, or Firm*—Richard E. Bee

[57] ABSTRACT

A microcode control mechanism is provided for producing the sequences of microwords used to control the execution of processor instructions in a microprogrammed data processor. This microcode control mechanism includes sequence counter circuitry for supplying a sequence of numbers and a programmable logic array mechanism responsive to the processor instruction and to the sequence of numbers for producing a sequence of microwords needed to execute the instruction. The microcode control mechanism also includes repeat circuitry responsive to a predetermined microword produced by the programmable logic array mechanism for setting the sequence counter circuitry back to a count which is less than the current count for causing a selected portion of the microword sequence to be repeated. The microcode control mechanism further includes a programmable repeat counter for counting the number of times the selected portion is repeated and for disabling the repeating action after a selected number of repeats.

13 Claims, 7 Drawing Figures

| INSTR | CLK | MW | ORIGIN | STROBE | EA SEQ COUNT | EX SEQ COUNT | OTHER CONTROL POINT SIGNALS |
|---|---|---|---|---|---|---|---|
| N-1 | A | 27 | XA | SXB | | +1 | |
| | B | 28 | XB | SXA | | | |
| | A | 29 | XA | SXB | | +1 | LOAD SAR |
| | B | 30 | XB | SXA | | | LOAD INSTRUCTION REGISTER |
| | A | 31 | XA | SXB | RESET | RESET | LOAD "A" BUFFERS |
| | B | 32 | XB | SAA | | | |
| N | A | 1 | AA | SAB | +1 | | |
| | B | 2 | AB | SAA | | | INCREMENT INSTR ADDR COUNTER |
| | A | 3 | AA | SAB | +1 | | |
| | B | 4 | AB | SAA | | | |
| | A | 5 | AA | SAB | | | LOAD REPEAT COUNTER; RESET LATCH |
| | B | 6 | AB | SXA | | | INCREMENT REPEAT COUNTER |
| EXECUTE LOOP #1 | A | 7 | XA | SXB | | +1 | |
| | B | 8 | XB | SXA | | | |
| | A | 9 | XA | SXB | | +1 | |
| | B | 10 | XB | SXA | | | |
| | A | 11 | XA | SXB | | +1 | |
| | B | 12 | XB | SXA | | | INCREMENT REPEAT COUNTER |
| | A | 13 | XA | SXB | | RESET | (RSTE0 RESETS SEQ COUNTER) |
| | B | 14 | XB | SXA | | | |

MICROWORDS 7-14 REPEATED "M" TIMES (ADDITIONAL LOOPS)

| INSTR | CLK | MW | ORIGIN | STROBE | EA SEQ COUNT | EX SEQ COUNT | OTHER CONTROL POINT SIGNALS |
|---|---|---|---|---|---|---|---|
| EXECUTE LOOP #M+2 | A | 7 | XA | SXB | | +1 | |
| | B | 8 | XB | SXA | | | |
| | A | 9 | XA | SXB | | +1 | |
| | B | 10 | XB | SXA | | | |
| | A | 11 | XA | SXB | | +1 | |
| | B | 12 | XB | SXA | | | INCR REPEAT COUNTER (SETS LATCH) |
| | A | 13 | XA | SXB | | +1 | (SEQ COUNTER RESET DEGATED) |
| | B | 14 | XB | SXA | | | |
| | A | 15 | XA | SXB | | +1 | LOAD SAR |
| | B | 16 | XB | SXA | | | LOAD INSTRUCTION REGISTER |
| | A | 17 | XA | SXB | RESET | RESET | LOAD "A" BUFFERS |
| | B | 18 | XB | SAA | | | |
| N+1 | A | 1 | AA | SAB | +1 | | |
| | B | 2 | AB | SAA | | | INCREMENT INSTR ADDR COUNTER |
| | A | 3 | AA | SAB | +1 | | |
| | B | 4 | AB | SAA | | | |

MICROCODE CONTROL MECHANISM UTILIZING PROGRAMMABLE MICROCODE REPEAT COUNTER

CROSS-REFERENCE TO RELATED APPLICATIONS

The present patent application is related to the following copending patent applications:

(1) Application Ser. No. 350,660, filed Feb. 22, 1982, entitled "Microword Control System Utilizing Multiplexed Programmable Logic Arrays", the inventors being Victor S. Moore et al;

(2) Application Ser. No. 350,662, filed Feb. 22, 1982, entitled "Microword Control Mechanism Utilizing A Programmable Logic Array And A Sequence Counter", the inventors being Joel C. Leininger et al;

(3) Application Ser. No. 350,663, filed Feb. 22, 1982, entitled "Microword Generation Mechanism Utilizing Separate Programmable Logic Arrays For First And Second Microwords", the inventors being Joseph C. Rhodes, Jr. et al;

(4) Application Ser. No. 334,185 filed Dec. 24, 1981, entitled "Large Scale Integration Data Processor Signal Transfer Mechanism", the inventors being Virgil D. Wyatt et al;

(5) Application Ser. No. 350,683 filed Feb. 22, 1982, entitled "Clocking Mechanism For Multiple Overlapped Dynamic Programmable Logic Arrays Used In A Digital Control Unit", the inventors being Gerard A. Veneski et al; and (6) Application Ser. No. 350,681 filed Feb 22, 1982, entitled "Integrated Circuit Mechanism For Coupling Multiple Programmable Logic Arrays To A Common Bus", the inventors being Wayne R. Kraft et al.

The descriptions set forth in these copending applications are hereby incorporated in the present application by this reference thereto.

TECHNICAL FIELD

This invention relates to microcode control mechanisms for use in microprogrammed data processors and digital computers wherein a sequence of microwords is used to control the execution of each processor instruction.

BACKGROUND ART

In a microprogrammed digital computer or data processor, microwords are read from an internal storage unit to provide the internal processor control actions which are needed to execute the processor instructions obtained from the user's software program. The microwords are read from the storage unit and set into a control register one at a time. Each microword consists of multiple binary bits, some or all of which may be organized into plural-bit control groups or fields. The control register drives a decoder mechanism which produces the elemental control point signals which, in turn, control the various data flow gates and data manipulation mechanisms located in the data processor. Each microword controls the internal operation of the data processor for one microword cycle. Several microwords are normally needed to execute each processor instruction. Some processor instructions require only a few microwords, while others require many microwords to complete their execution.

A good example of a microprogrammed data processor is described in U.S. Pat. No. 4,173,041, issued on Oct. 30, 1979 to T. J. Dvorak et al. As indicated in this Dvorak et al patent, the microwords may be located in a separate storage unit called a "control storage", or they may be located in a portion of the processor main storage unit which is set aside for the exclusive use of the microwords. For the case of separate control storage units, these units may be of either the read/write type or of the read only type. In smaller data processors, the current trend is to store the microwords in a so-called read only storage (ROS) unit. In any event, the microword storage units currently used are of the random access type and include the customary addressing circuitry for addressing any desired one of the storage locations in the storage units.

SUMMARY OF INVENTION

This invention is an improvement which may be used in connection with the basic invention described in the above listed co-pending patent application Ser. No. 350,662, entitled "Microword Control Mechanism Utilizing A Programmable Logic Array And A Sequence Counter", to provide reduced circuit complexity and increased flexibility of use for some embodiments of such basic invention. As discussed in the co-pending application, one embodiment of the basic invention provides an improved microword control mechanism wherein the customary control storage unit and addressing circuitry are replaced by a programmable logic array (PLA) and a sequence counter. The operation code portion of the processor instruction and the sequence counter are used to drive the PLA which, in response to a particular operation code and a particular sequence count, produces a particular microword at its output. In an approximate sense, the PLA "stores" the microwords, while the operation codes and sequence counts provide the "addresses" for selecting the microwords. By way of comparison, with a conventional random access storage unit, however, the PLA does not have to accommodate each address in the overall address range and does not have to provide any hardware for the unaccommodated addresses. In general, this will enable a significant savings in the size of the PLA structure as compared to the size of a conventional storage array structure, particularly for the case of processor instruction sets having a non-regular operation code format wherein the number and location of the effective operation code bits can vary from instruction to instruction.

The co-pending application further describes certain embodiments of the basic invention wherein the microwords from the PLA are supplied to a decoder mechanism and one or more of the control point signals produced by the decoder mechanism are used to control the sequence counter to provide a microcode looping action whereby selected portions of a microword sequence may be repeated one or more times. This looping action reduces the number of microwords needed and hence reduces the size of the PLA.

In order to terminate the looping action after a desired number of repetitions, the copending application employs a fixed capacity repeat counter for counting the number of microcode loops and for terminating the looping action when the count established by the capacity of the repeat counter is exceeded. While this provides the desired result, it is somewhat cumbersome if microcode loops are to be provided for different types of processor instructions where the number of loops for the different instructions are different. The present invention overcomes this disadvantage by providing a programmable repeat counter which can be loaded with different initial count values for different processor instructions to provide different numbers of repeats for the microcode loops for the different instructions. The use of such a programmable repeat counter will reduce the amount of circuitry needed in those applications where microcode looping is provided for two or more different processor instructions. Such use also provides increased flexibility in cases where the number of repeats either varies or needs to be changed. This includes a change of an existing instruction or the addition of a new instruction having a different repeat number. It further includes the case of variable field length instructions wherein the number of repeats required for the same instruction will vary from time to time in accordance with the amount of data to be processed by such instruction.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

Figure 1:
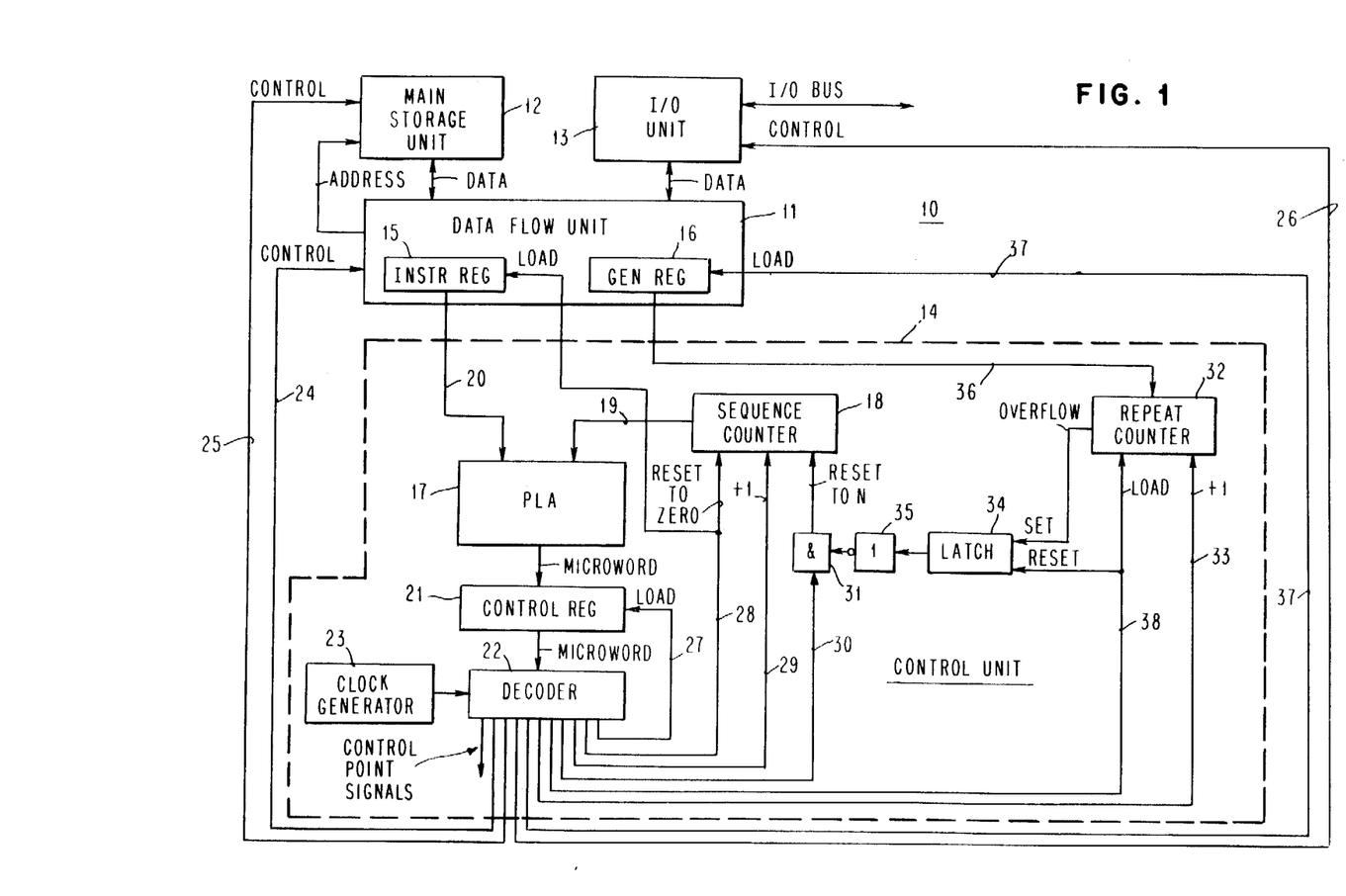
FIG. 1 is a functional block diagram of a data processor having incorporated therein an improved microcode control mechanism constructed in accordance with the present invention.

DESCRIPTION OF THE FIG. 1 EMBODIMENT

Referring to FIG. 1, there is shown a functional block diagram of a digital computer or data processor 10. This data processor 10 includes a data flow unit 11, a main storage unit 12, an input/output (I/O) unit 13 and a control unit 14. The data flow unit 11 is sometimes called a central processing unit (CPU) and includes such things as an arithmetic and logic unit (ALU), various hardware registers, a local storage unit, a bus system interconnecting these items and various sets of gate circuits associated with the bus system for controlling the movement of data between these units. The data flow unit 11 is the unit that does the adding, subtracting, rearranging and other manipulations of the data to produce the desired results. It also moves data into and out of the main storage unit 12 and to and from the I/O unit 13.

The program which is performed by the data flow unit 11 is determined by the user program which is loaded into the main storage unit 12. This program is comprised of a series of processor instructions which are read out of the storage unit 12 and supplied to the data flow unit 11 one at a time in a sequential manner to determine the major operations to be performed by the data flow unit 11.

Among other things, the data flow unit 11 includes a plural-bit instruction register 15 into which is loaded the processor instruction to be executed. This processor instruction is obtained from the main storage unit 12 and is one of the instructions which make up the user program being performed by the data processor 10. In some data processors, only a portion of the complete processor instruction is loaded into the instruction register 15. In such case, the portion loaded into the instruction register 15 includes at least the effective operation code portion of the instruction. For example, in data processors where the complete instruction may include more than one word, only the first word of the instruction may be loaded into the instruction register 15, provided this first word contains the effective operation code. By "effective" operation code is meant all the bits in the processor instruction which are needed to uniquely define the kind of operation to be performed by the data processor 10. This does not include operand address bits and length count bits, but does include function bits and modifier bits which are needed to complete the definition of the operation to be performed.

Also included in the data flow unit 11 is a general register 16 which is used as a working register for temporarily storing data values, address values and the like during the performance of the program. Typically, a data flow unit will include several such general registers. They are sometimes located in a so-called local storage unit.

The control unit 14 controls the operation of the data flow unit 11, the main storage unit 12 and the I/O unit 13. The control unit 14 is of the microprogrammed type and includes an improved microcode control mechanism constructed in accordance with the present invention. This improved microcode control mechanism includes a programmable logic array (PLA) 17 and a sequence counter 18. One definition of a PLA is that it is a fixed, orderly structure of logic circuits that can be personalized to perform a specific set of logic equations. Typically, a PLA includes an input AND array connected by a goodly number of products or word lines to an output OR array, with all of the structure being fabricated on the same integrated circuit chip. The sequence counter 18 may take the form of, for example, a plural-bit binary counter for supplying plural-bit binary number signals by way of a plural-bit bus 19 to a first set of inputs for the PLA 17.

The PLA's described in this patent application may be of either the static or dynamic type. For simplicity of explanation, however, they will be spoken of herein as though they were of the static type.

The microcode control mechanism further includes instruction circuitry responsive to the processor instruction to be executed for providing a plural-bit instruction dependent signal uniquely representative of such instruction. In the present embodiment, this circuitry is represented by a plural-bit bus 20 which couples the output of the instruction register 15 to a second set of inputs of the PLA 17. In the present embodiment, the instruction dependent signal supplied by way of the bus 20 includes at least the effective operation code bits of the instruction in the instruction register 15.

Buses 19 and 20 are connected to the input AND array portion of the PLA 17. In response to a particular operation code on bus 20 and a particular sequence count on bus 19, the PLA 17 produces at its output a particular plural-bit microword. This microword is obtained from the OR array section of the PLA 17.

The control unit 14 further includes primary control circuitry responsive one at a time to the microwords from the PLA 17 for producing for each microword a plurality of control point signals for controlling the operation of the data processor 10 for one microword cycle. In the present embodiment, this primary control circuitry includes a plural-bit control register 21, a decoder 22 and a clock generator 23. The number of bit positions in the control register 21 is the same as the number of bit positions in a single microword. The microword appearing at the output of PLA 17 is loaded into the control register 21 at the end of the current microword cycle. The microword residing in control register 21 drives the decoder 22 to cause the decoder 22 to produce the particular control point signals needed for that particular microword.

In general, the microword will include several encoded plural-bit control fields. Decoder 22 decodes these control fields to produce the appropriate individual control point signals. Any non-encoded or bit-significant bits in the microword will be supplied straight through by the decoder 22. The clock generator 23 supplies the clock pulses which determine the points in time at which the control point signals actually appear at the output of the decoder 22. In some data processors, there is one clock pulse per microword cycle, while in other processors there are a group of time-spaced clock pulses for each microword cycle. Decoder 22 will typically have a relatively large number of control point output lines. In a typical data processor, there may be a hundred or more such output lines. For any given microword, only a relatively small number of these lines, on the order of 10 or less, will be activated to produce the desired control actions for that particular microword.

The majority of the control point signals are supplied by a multiconductor control bus 24 to the data flow unit 11 for controlling the various data flow gates, register loading circuits and other elements located in the data flow unit 11. Some control point signals are supplied by way of a plural-bit control bus 25 to the main storage unit 12, while other control point signals are supplied by way of a plural-bit control bus 26 to the I/O unit 13. One of the control point signals is supplied by way of a line 27 to time the loading of the control register 21. Another of the control point signals is supplied by way of a line 28 to control the loading of the instruction register 15 and the resetting of the sequence counter 18, these two actions serving to initiate the microword sequence for the next processor instruction.

The control unit 14 further includes circuitry for incrementing the count in the sequence counter 18 for causing the programmable logic array 17 to produce additional microwords for any given operation code in the instruction register 15. In the present embodiment, this is accomplished by supplying a control point signal by way of line 29 to the increment or +1 input terminal of the sequence counter 18. Normally, this control point signal is provided on line 29 for each microword supplied to the control register 21. This increases the count in the sequence counter 18 by a value of one count for each microword cycle. The timing is such that immediately after a particular microword is loaded into the control register 21, the sequence counter 18 is incremented by one to enable the PLA 17 to commence producing the next microword. In this manner, the PLA 17 is caused to produce a sequence of microwords for any given operation code residing in the instruction register 15. The last microword in the sequence, on the other hand, will cause the control point signal line 28 to instead be activated to load the next instruction into the instruction register 15 and to reset the sequence counter 18 to an initial starting count which, for sake of explanation, will be assumed to be a count of zero.

The control unit 14 further includes repeat circuitry responsive to a predetermined microword for setting the sequence counter 18 back to a count "N" which is less than the current count for causing a selected portion of the microword sequence to be repeated. This repeat circuitry includes a control point signal line 30 and an AND circuit 31 which are responsive to the occurrence of a predetermined control point signal from the decoder 22 for supplying a "Reset to N" signal to the sequence counter 18. AND circuit 31 is "normally" enabled so as to pass the control point signal on line 30 to the "Reset to N" terminal. The "Reset to N" terminal is connected to the various stages in the sequence counter 18 in the appropriate manner so that, when the control point signal on line 30 is supplied thereto, it forces the sequence counter 18 to assume a count value of N.

In a typical operation, the sequence counter 18 starts at a count value of zero and is incremented by steps of one until it reaches a count value of X. The microword produced for count X has either a single bit or a field of bits which are coded to cause the decoder 22 to activate the control point line 30. This resets the sequence counter 18 to a count N which is less than X but greater than zero. The sequence counter 18 is then incremented by steps of one back up to the count value of X. The resulting microword for count X again activates the control point line 30 to again reset the sequence counter back to the count of N. In this manner, a selected portion of the microword sequence for a given processor instruction is caused to be repeated over and over again. This multiple use of the same set of microwords in the PLA 17 reduces the number of microwords needed in the PLA 17 and hence reduces its size.

The control unit 14 also includes programmable repeat control circuitry including a repeat counter 32 for counting the number of times the selected portion of the microword sequence is repeated and for disabling the repeat circuitry 30,31 after a predetermined number of such repetitions. This repeat control circuitry includes a control point signal line 33 responsive to a predetermined control point signal produced by a predetermined microword occurring during the repeated portion of the microword sequence for incrementing the repeat counter 32. In other words, one of the microwords occurring during the microcode portion to be repeated is coded to activate the control point line 33 during the microword cycle during which it drives the decoder 22. In this manner, the repeat counter 32 is caused to count the number of loops or number of passes made through the repeated microcode portion.

The programmable repeat control circuitry further includes circuitry responsive to the occurrence of a predetermined count in the repeat counter 32 for disabling the AND circuit 31 to prevent any further repeat of the selected microcode portion. In the present embodiment, this circuitry includes a latch circuit 34 which is set by an overflow signal from the repeat counter 32. The set condition of latch 34 is inverted by an inverter circuit 35 to disable the AND circuit 31 by supplying a binary zero level signal to the second input thereof. This disables the supplying of the "Reset to N" signal to the sequence counter 18.

In the present embodiment, the repeat counter 32 is initially loaded with a number value representing the complement of the number of repeats desired for the selected microcode portion. In this manner, repeat counter 32 is caused to produce an overflow signal when the desired number of repeats have been counted.

The microcode control mechanism further includes circuitry for loading into the repeat counter 32 an initial number value which determines the number of repetitions that will be allowed for the portion of the microword sequence selected to be repeated. In the present embodiment, this includes circuitry for extracting from the main storage unit 12 a programmed number value and loading such number value into the repeat counter 32. This is accomplished by way of the general register 16 in the data flow unit 11 and a multiple-bit binary signal bus 36 which transfers the contents of the general register 16 to the repeat counter 32 in a parallel manner. This general register 16 is loaded with the desired number value by a processor instruction occurring at some point in the user program which is before the occurrence of the processor instruction for which the repeat action is to be provided. As indicated, this number value is the complement of the desired number of passes through the selected microcode portion. The loading of the general register 16 is controlled by a control point signal line 37 coming from the output of the decoder 22. The loading of the initial number value from the general register 16 into the repeat counter 32 is controlled by a further control point signal line 38 which runs to the load control terminal of the repeat counter 32. The control point signal on line 38 is also supplied to the latch circuit 34 to reset it to its zero condition. This reactivates or reenables AND circuit 31.

The control point line 38 is activated by one of the microwords for the processor instruction having the portion to be repeated. This microword which activates the control point line 38 occurs ahead of or before the occurrence of any of the microwords which are to be repeated. Thus, the control point line 38 is activated by a microword produced before the sequence counter 18 reaches a count value of N. In this manner, the repeat counter 32 is loaded with the initial count and the AND circuit 31 is enabled before the occurrence of the first microcode repeat signal on the control point line 30.

An advantage of the present invention is the flexibility in selecting the number of repeats for the microcode portion to be repeated. For example, this selection can be controlled and determined by the user program which is being performed by the data processor. This is important for the case of variable field length (VFL) processor instructions wherein the number of bytes of data to be manipulated can be different for different occurrences of the same one of such VFL instructions. Such VFL processor instructions normally include a byte count field which is coded to specify the number of bytes to be handled. This byte count value is used to provide the initial number value which is loaded into the general purpose register 16 and subsequently into the repeat counter 32. Since the repeat counter 32 needs the complement of the number of repeats, this byte count value is complemented and the complement thereof loaded into the general register 16. In this manner, the present invention accommodates variable field length processor instructions having different byte count values.

Figure 2:
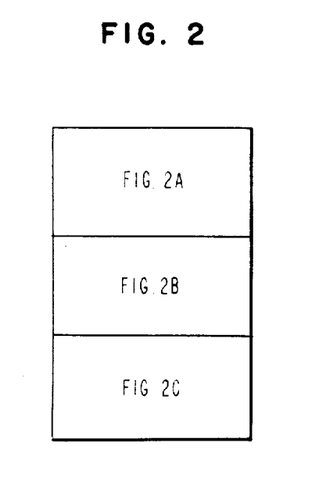
FIG. 2 shows the relationship between FIGS. 2A, 2B and 2C.

DESCRIPTION OF THE FIG. 2 EMBODIMENT

Figure 2A:
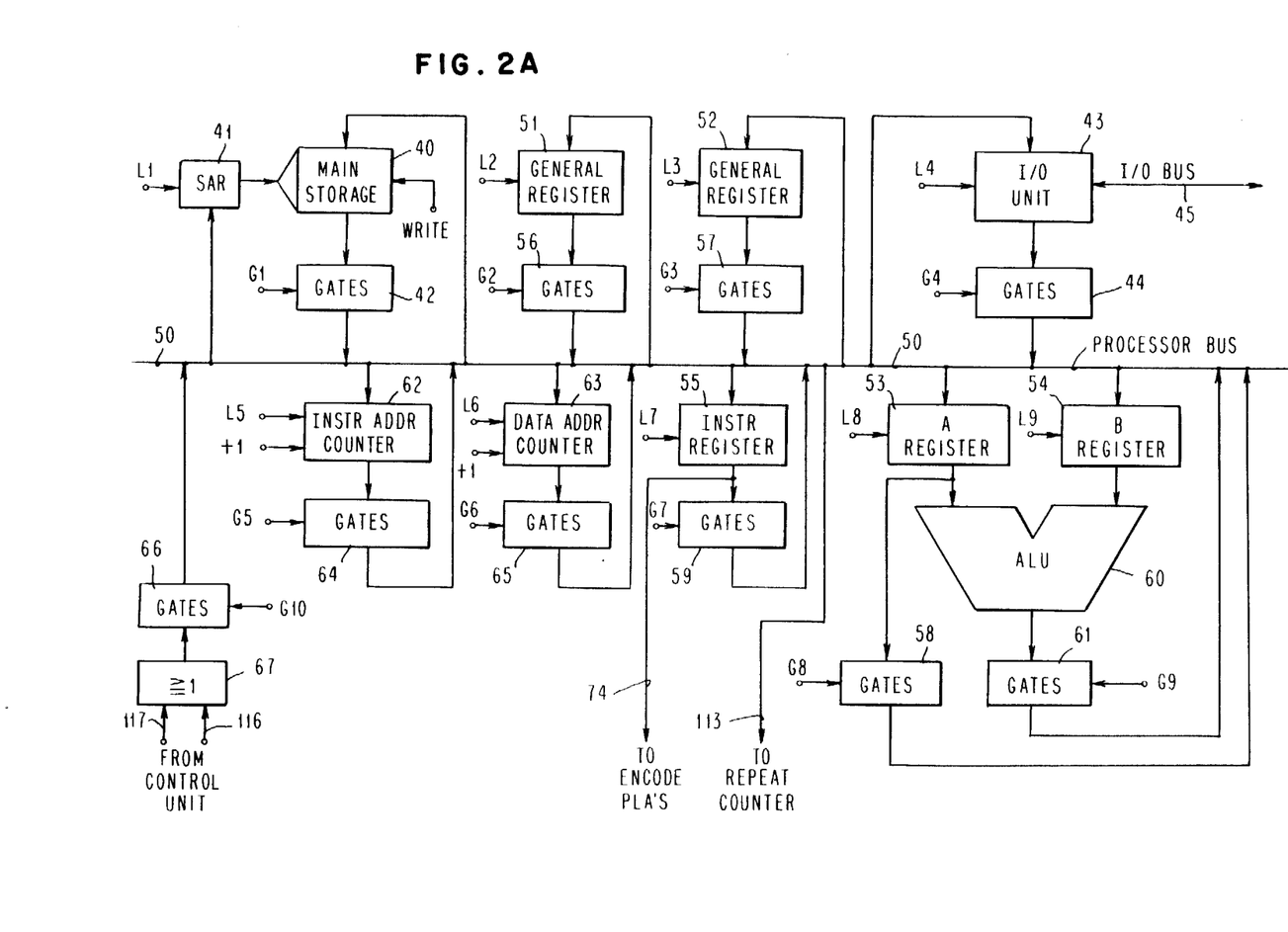
FIG. 2A shows in greater detail a representative form of construction for the data flow unit of a data processor.
Figure 2B:
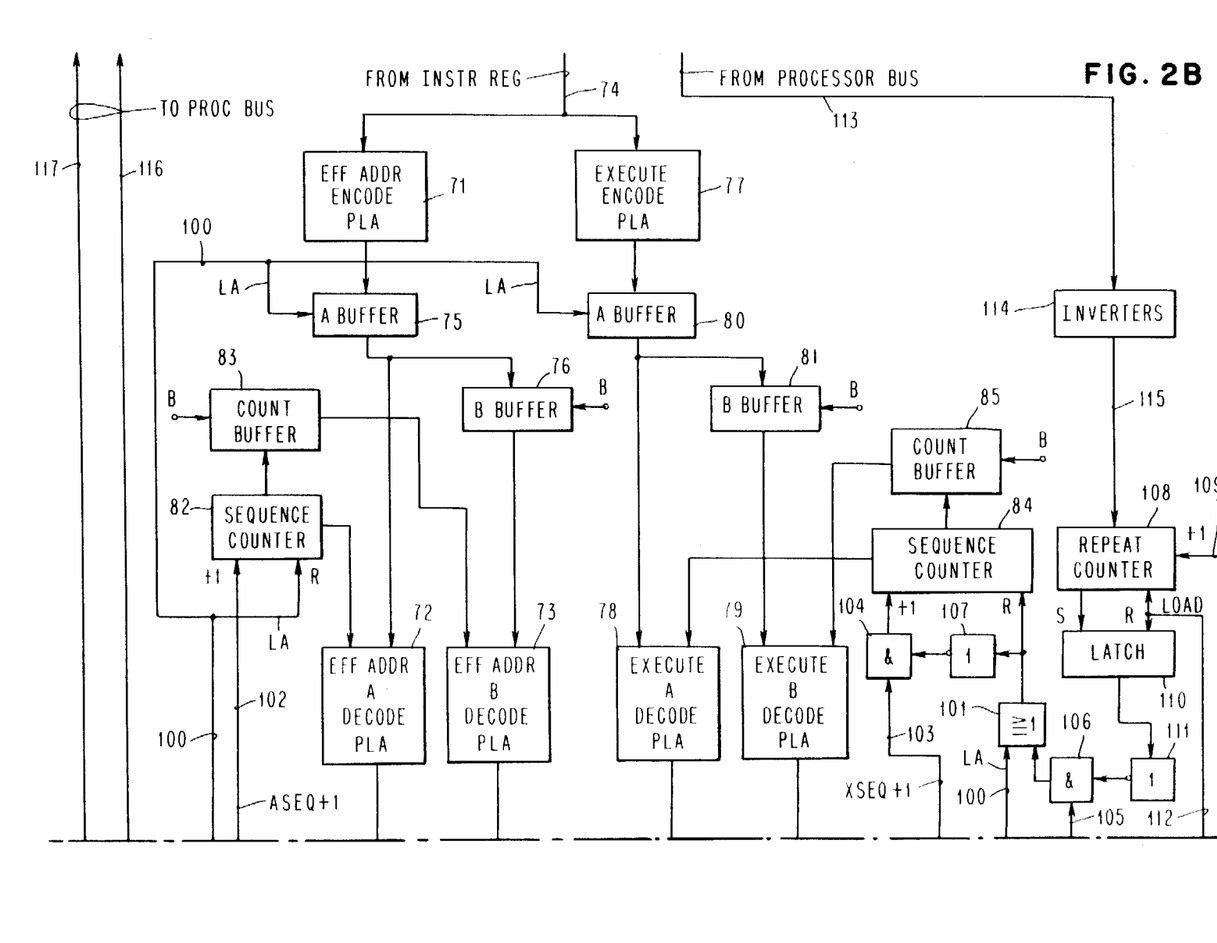
FIGS. 2B and 2C, taken together, show a functional block diagram of a further embodiment of a microcode control mechanism constructed in accordance with the present invention and usable with the data flow unit of FIG. 2A.
Figure 2C:
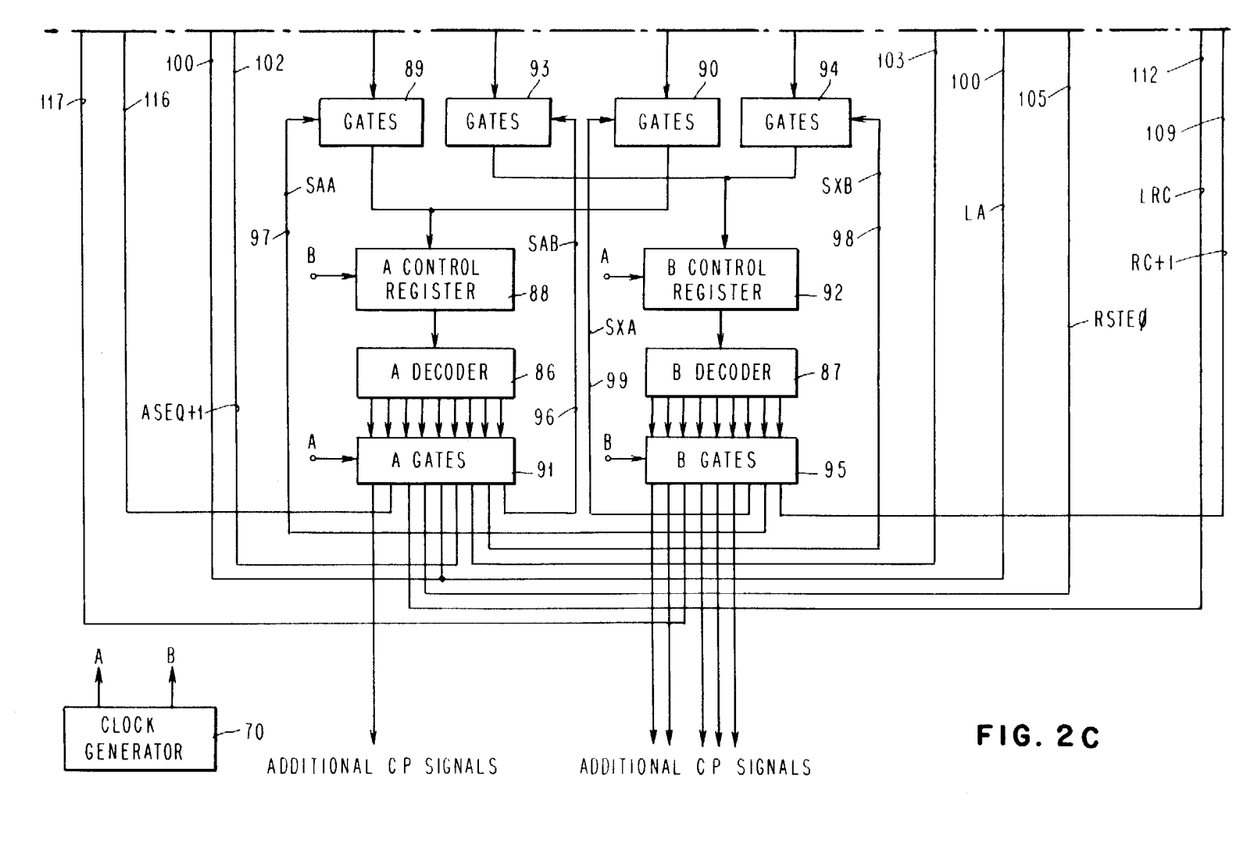

Referring to FIG. 2, there is shown a functional block diagram of a digital data processor which includes a further embodiment of a microcode control mechanism constructed in accordance with the present invention. FIG. 2A shows the details for the data flow unit, the main storage unit and the I/O unit portion of the data processor, while FIGS. 2B and 2C shows the details for the control unit portion of the data processor.

Referring to FIG. 2A, there is shown a main storage unit which includes a main storage mechanism 40, a storage address register (SAR) 41 and a set of storage output gates 42. FIG. 2A further shows an input/output (I/O) unit which includes I/O unit 43 and I/O unit gates 44. The I/O unit 43 is connected to an external I/O bus 45 which runs to various data processor peripheral units. The remainder of FIG. 2A shows various details for a more or less typical data flow unit. This data flow unit includes a multiconductor processor bus 50 which, in addition to providing the primary data flow path for the various registers and so forth in the data flow unit, also provides the point of connection for the main storage unit 40-42 and the I/O unit 43,44. As a preliminary step to the running of the user program, such user program is initially loaded into the main storage 40 from a peripheral unit by way of the I/O bus 45, the I/O unit 43, gates 44 and processor bus 50.

The data flow unit of FIG. 2A includes various multiple-bit binary registers which are coupled to the processor bus 50. These are represented by general purpose registers 51 and 52, A and B registers 53 and 54 and instruction register 55. The inputs of these registers are connected directly to the processor bus 50 and the outputs of registers 51,52,53 and 55 are connected to the processor bus 50 by way of gates 56,57,58 and 59, respectively. A and B registers 53 and 54 drive the A and B input of an arithmetic and logic (ALU) unit 60. The output of ALU 60 is connected by way of gates 61 to the processor bus 50.

A typical data processor will normally include more than two general purpose registers. In many cases, such general registers will be included as part of a so-called local storage unit.

The data flow unit of FIG. 2A further includes various multiple-bit binary counters which are also coupled to the processor bus 50. This includes an instruction address counter 62 and a data address counter 63, the inputs of which are coupled directly to the processor bus 50 and the outputs of which are coupled by way of gates 64 and 65, respectively, to the processor bus 50. These counters 62 and 63 provide address values which can be loaded into SAR 41 for purposes of accessing instructions and data into and out of the main storage 40. The data flow units of FIG. 2A further include a set of gate circuits 66 and a set of OR circuits 67 for supplying address values and other number values from the control unit portion of FIG. 2C to the processor bus 50.

The L1,L2,L3, etc. control signal lines shown in FIG. 2A are control point (CP) signal lines which run to and are connected to the outputs of the decoder mechanisms included in the control unit portion of FIG. 2C. These control point signal lines control the loading of the various registers and counters shown in FIG. 2A. The control signal lines G1,G2,G3, etc. shown in FIG. 2A are further control point lines which are also connected to the outputs of the control unit decoder mechanisms. They control the enabling of the various sets of gates shown in FIG. 2A. The +1 control lines for the counters 62 and 63 are increment control lines for incrementing the counts in counters 62 and 63. They also are control point signal lines which are connected to the appropriate outputs of the control unit decoder mechanisms.

Figure 3:
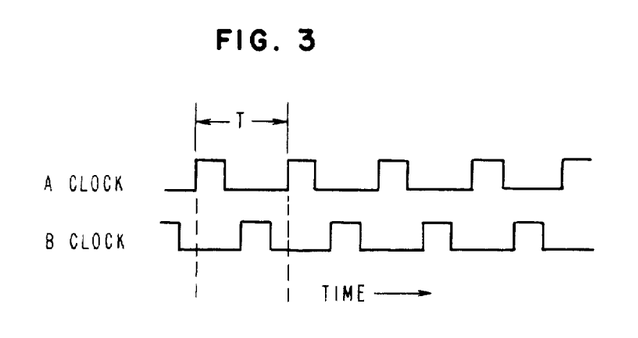
FIG. 3 is a timing diagram used in explaining the operation of the FIGS. 2B and 2C microcode control mechanism.

Referring to FIG. 2C, the microcode control unit there shown includes a clock generator 70 for timing the operations of the other elements in the control unit. This clock generator 70 is a two-phase non-overlapping clock generator. It generates the A phase and B phase clock signals shown in FIG. 3. Both of these clock signals are of the same frequency and have the same waveshape, the difference being that they are displaced in time relative to one another. The positive pulses of the A clock do not overlap with the positive pulses of the B clock. The amount of non-overlap shown in FIG. 3 is exaggerated for purposes of clarity. When a register is indicated as being loaded or a set of gates are indicated as being enabled by the A clock, this loading or gating occurs during the positive pulse portion of the A clock waveform. Similarly, when a register is indicated as being loaded or a set of gates is indicated as being enabled by the B clock, such loading or enabling takes place during the positive pulse portion of the B clock waveform.

The microcode control mechanism portion of FIG. 2B includes first and second programmable logic array (PLA) mechanisms responsive to a processor instruction to be executed for respectively producing microwords for first and second segments of the microword sequence needed to execute the processor instruction. The first PLA mechanism includes an encode PLA 71, an A decode PLA 72 and a B decode PLA 73. The PLA's 71,72 and 73 are labelled as "effective address" (EFF. ADDR.) PLA's and are used to provide the microwords for the first part or segment of the overall microword sequence needed to execute the processor instruction then resident in the instruction register 55 (FIG. 2A). In general, this first segment of the microword sequence serves to perform the effective address calculations for the operand or operands to be manipulated and to fetch such operands from the main storage unit 40. The A and B decode PLA's 72 and 73 take turns in generating the microwords for this effective address calculation segment of the overall microword sequence.

The effective operation code portion of the processor instruction resident in instruction register 55 (FIG. 2A) is supplied by way of bus 74 to the input of the encode PLA 71. In response thereto, encode PLA 71 produces an instruction identification (ID) number which uniquely identifies the type of processor instruction to be executed. Encode PLA 71 is a relatively small PLA which is used to convert the operation code from the instruction register 55 into an instruction ID signal having a lesser number of bits. This reduces the number of input lines required in the AND arrays of each of the A and B decode PLA's 72 and 73. The instruction ID number from encode PLA 71 is supplied by way of A buffer 75 to a first set of inputs of the AND array portion of the A decode PLA 72. This ID number is also supplied from the A buffer 75 by way of a B buffer 76 to a first set of inputs of the AND array portion of the B decode PLA 73.

The second PLA mechanism of FIG. 2B includes an encode PLA 77, an A decode PLA 78 and a B decode PLA 79. These PLA's are labelled as "Execute" PLA's and are used to provide the microwords for the last part or segment of the overall microword sequence needed to execute the processor instruction resident in the instruction register 55. In particular, the A and B decode PLA's 78 and 79 take turns in providing the microwords which are needed to "execute" the processor instruction, that is, to perform the desired operand manipulation or manipulations called for by the processor instruction. After the operand manipulations, the decode PLA's 78 and 79 provide any further microwords that may be needed to complete the overall microword sequence for that particular processor instruction.

The execute encode PLA 77 functions in a manner similar to the effective address encode PLA 71 to provide an instruction ID number having a lesser number of bits than the instruction word resident in the instruction register 55. This execute ID number is supplied by way of an A buffer 80 to a first set of inputs of the AND array portion of the A decode PLA 78. The execute ID number of buffer 80 is also supplied by way of a B buffer 81 to a first set of inputs of the AND array portion of the B decode PLA 79.

The microcode control mechanism of FIG. 2B further includes first and second sequence counter mechanisms for respectively driving the first and second PLA mechanisms for enabling them to produce their respective segments of the overall microword sequence. The first sequence counter mechanism is comprised of a sequence counter 82 and a count buffer 83. Sequence counter 82 is operative during the first or effective address segment of the microword sequence for supplying a sequence of plural-bit binary number signals to a second set of inputs of the AND array portion of the effective address A decode PLA 72. Count buffer 83 supplies a delayed version of the sequence count in counter 82 to a second set of inputs of the AND array portion of the effective address B decode PLA 73.

The second sequence counter mechanism includes a second sequence counter 84 and a second count buffer 85 for use with the second PLA mechanism 77-79. More particularly, the sequence counter 84 is operative during the second or "execute" segment of the overall microword sequence for supplying a sequence of plural-bit binary number signals to a second set of inputs of the AND array portion of the execute A decode PLA 78. The count buffer 85 supplies a delayed version of the sequence counter to a second set of inputs of the AND array portion of the execute B decode PLA 79.

The microcode control mechanism portion of FIG. 2C includes decoder circuitry responsive to the microwords from the decode PLA's 72,73,78 and 79 for producing for each microword a plurality of control point (CP) signals for controlling the operation of the data processor for one microword cycle. This decoder circuitry includes an A decoder 86 and a B decoder 87. A decoder 86 handles the microwords from the A decode PLA's 72 and 78. The microwords from A decode PLA 72 are supplied to an A control register 88 by way of a set of parallel gating circuits or gates 89. Microwords are supplied to the A control register 88 from the A decode PLA 78 by way of a set of gates 90. The A control register 88 drives the A decoder 86. The output control point signal lines from the A decoder 86 are coupled to the remainder of the system by way of a set of parallel decoder output A gates 91. These A gates 91 are simultaneously enabled by each positive A clock pulse. Thus, the control point signals from the A decoder 86 are operative only during the positive A clock intervals.

The B decoder 87 decodes the microwords from the B decode PLA's 73 and 79. The microwords from the B decode PLA 73 are supplied to a B control register 92 by way of a set of gate circuits 93 and the microwords from the B decode PLA 79 are supplied to the same B control register 92 by way of a set of gates 94. The B control register 92 drives the B decoder 87. The output control point signal lines from the B decoder 87 are supplied to the remainder of the system by way of a set of decoder output B gates 95. These gates 95 are simultaneously enabled by each positive B clock pulse from the generator 70. Thus, the control point signals from the B decoder 87 are operative only during the positive B clock intervals.

Each of the various control point signals L1,L2,L3, etc. and D1,D2,D3, etc. shown in FIG. 2A can be provided by both the A decoder 86 and the B decoder 87. For example, for the L1 control point signal for SAR 41, the A decoder 86 has an L1 control point output line and the B decoder 87 also has an L1 control point output line. These decoder output L1 lines are OR'ed together to provide a single L1 control point line which runs to the SAR 41. For simplicity of illustration, this OR'ing circuitry is not shown in the drawings. Thus, SAR 41 can be loaded during either the A clock phase or the B clock phase. Similar considerations apply for each of the other L and G control point signals shown in FIG. 2A. Each can be activated during either one of the A and B clock phases.

The microcode control mechanism of FIG. 2C further includes multiplexer circuitry for enabling the microwords from the different decode PLA's 72,73,78 and 79 to take turns in controlling the operation of the data processor. A first part of this multiplexing circuitry is represented by the decode PLA output gates 89,90,93, and 94. The selective activation or enabling of these gates determines which of the decode PLA's are allowed to supply microwords to the A and B control registers 88 and 92. Only one set of these gates is enabled at any given moment. This enabling is controlled by PLA strobe control point signals developed by the A and B decoders 86 and 87. More particularly, each of the A and B decoders 86 and 87 includes a group of output control point lines which are used to provide PLA strobes. Each microword produced by a decode PLA includes a plural-bit PLA strobe field. The coding of this PLA strobe field for any given microword will cause a particular one of the PLA strobe control point lines to be activated when that microword is resident in the control register. Thus, each microword, when it becomes active to control the data processor, also acts to produce a PLA strobe to select the particular decode PLA to supply the next microword to a control register.

A second part of the multiplexer circuitry is provided by the output A gates 91 and the output B gates 95 for the two decoders 86 and 87. These A and B gates 91 and 95 alternately allow the microwords resident in the A and B control registers 88 and 92 to take turns in controlling the operation of the data processor. First the A microword in the A control register 88 is operative by way of A decoder 86 and A gates 91 to control the data processor, then the B microword in the B control register 92 is operative by way of the B decoder 87 and the B gates 95 to control the data processor, then the A microword in the A control register 88 is operative by way of the A decoder 86 and the A gates 91 to control the data processor, and so forth, in a back and forth manner which alternates between the A and B microwords.

During the first segment of the microword sequence for any given processor instruction, the effective address A and B decode PLA's 72 and 73 are operative to supply the microwords to the A and B control registers 88 and 92, respectively. When the A gates 91 are activated to put the A control register microword in control of the data processor, a PLA strobe signal SAB is provided on the A decoder control point line 96 to enable the gates 93 to supply the microword from the effective address B decode PLA 73 to the B control register 92, this microword being loaded into the B control register 92 by the A clock pulse then being applied thereto. Conversely, when the B gates 95 are activated to enable the B control register microword to control the data processor, a PLA strobe signal SAA is supplied by way of a B decoder control point line 97 to the A decode gates 89 to enable the A decode PLA to supply a microword to the A control register 88, which microword is loaded into the A control register 88 by the B clock pulse then being supplied thereto. During this first or "effective address" segment of the overall microword sequence, the execute decode PLA gates 90 and 94 are not activated or enabled. During this effective address segment of the microword sequence, only the effective address decode PLA's 72 and 73 are used to control the data processor, with the microwords from these PLA's alternating or taking turns in providing the control.

During the last or execute segment of the overall microword sequence, a similar type of procedure is followed for the execute decode PLA's 78 and 79. More particularly, when the A gates 91 are enabled to place the A control register microword in control of the data processor, an SXB PLA strobe signal is produced on the A decoder output line 98 to enable gates 94 to enable the microword from the execute B decode PLA 79 to be supplied to the B control register 92. Conversely, when the B gates 95 are enabled to place the B control register microword in control of the data processor, an SXA PLA strobe signal is supplied by way of a B decoder output control point line 99 to enable gates 90 to supply the microword from the execute A decode PLA 78 to the A control register 88. In this manner, during the execute segment of the overall microword sequence, the execute decode PLA's 78 and 79 alternately take turns in providing the microword which controls the data processor.

The manner of switching from the effective address segment of the overall microword sequence to the execute segment is of particular interest. This segment switching is also controlled by the PLA strobes. In particular, when switching from the effective address segment to the execute segment, the coding of the PLA strobe field of the last microword in the effective address segment is coded to select one of the execute decode gates 90 and 94, instead of the other of the effective address decode gates 89 and 93. Assume, for example, that the last microword in the effective address segment is a B microword in the B control register 92. During the B clock interval when the B gates 95 are enabled, the SXA strobe control point line 99 is activated by this last microword to supply the execute A decode microword to the A control register 88. Previous to this last microword in the effective address segment, the B microwords in B control register 92 were effective to activate the SAA strobe control point line 97. Thus, the coding of the PLA strobe field of a microword controls the switching from the effective address segment to the execute segment of the overall microword sequence.

In a similar manner, the PLA strobe field in the last microword for the execute segment is coded to cause a switching back to the effective address segment, this effective address segment being the first segment of the microword sequence for the next processor instruction. Assuming, for example, that the last microword in the execute segment is a microword from the B decode PLA 79, which microword is then residing in the B control register 92, then for this microword the SAA strobe control point line 97 is activated to enable the gates 89 to select the next microword from the effective address A decode PLA 72.

The loading of the A buffers 75 and 80 and the resetting to zero of the sequence counters 82 and 84 are accomplished by activation of a control point line 100 from the A decoder 86. The resetting of the execute sequence counter 84 is accomplished by way of an OR circuit 101. Incrementing of the effective address sequence counter 82 is accomplished by activation of a control point line 102 from the A decoder 86. Incrementing of the execute sequence counter 84 is accomplished by means of an XSEQ +1 signal which is supplied by way of an A decoder control point line 103 and an AND circuit 104 to the +1 input of such sequence counter 84. Separate increment control point lines 102 and 103 are provided for the two sequence counters 82 and 84 so that, among other things, the effective address sequence counter 82 need not be incremented during the execute segment and the execute sequence counter 84 need not be incremented during the effective address segment of the microword sequence.

The microcode control mechanism of FIG. 2B further includes repeat circuitry responsive to a predetermined microword from the second PLA mechanism 77-79 for resetting the second sequence counter mechanism 84 for causing a selected portion of the second or "execute" segment of the microword sequence to be repeated. This repeat circuitry includes an A decoder control point line 105, an AND circuit 106 and the OR circuit 101, the output of which is connected to the reset to zero (R) terminal of the sequence counter 84. The AND circuit 106 is "normally" enabled so that a reset signal on control point line 105 will pass therethrough to the OR circuit 101.

When it is desired to cause a repeat of a selected portion of the execute segment of the microword sequence, the last microword in the selected portion is coded to cause the A decoder 86 to activate the reset control point line 105. This provides on the control point line 105 an RSTE$\phi$ (Reset to Execute $\phi$) signal which is supplied by way of AND circuit 106 and OR circuit 101 to the reset to zero (R) terminal of the execute sequence counter 84. This resetting of the execute sequence counter 84 causes the execute decode PLA's 78 and 79 to repeat that portion of the execute segment starting with the first microword in the execute segment and ending with the microword following the microword that produced the RSTE$\phi$ signal on control point line 105.

An inverter circuit 107 is coupled between the output of the OR circuit 101 and the second input of the AND circuit 104 to disable the supplying of the increment signal to the +1 terminal of the sequence counter 84 when the reset signal is being supplied to the reset terminal of the sequence counter 84.

The microcode control mechanism of FIG. 2B further includes programmable repeat control circuitry including a repeat counter 108 for counting the number of times the selected portion of the execute segment of the microword sequence is repeated and for disabling the repeat circuitry 105,106 after a predetermined number of such repetitions. This repeat control circuitry includes circuitry responsive to a predetermined control point signal produced by a predetermined microword in the selected or repeated portion of the execute segment for incrementing the repeat counter 108. This includes a control point line 109 coupled to the output of the B decoder 87 for supplying an RC+1 increment signal to the +1 input of the repeat counter 108. This signal is produced by one of the microwords in the microword portion selected to be repeated. Thus, the repeat counter 108 is incremented by a count of one for each pass through this selected microword portion.

In the present embodiment, the repeat control circuitry also includes latch circuitry 110 responsive to an overflow signal from the repeat counter 108 for disabling the supplying of the RSTE$\phi$ reset signal to the reset terminal R of the sequence counter 84. The overflow signal from the repeat counter 108 is supplied to the set terminal S of the latch 110 to place it in a set condition. The resulting binary one level signal at the output of latch 110 is inverted by an inverter circuit 111 to supply a zero level signal to the second input of the AND circuit 106. This disables the AND circuit 106 and prevents the supplying of the RSTE$\phi$ repeat signal to the execute sequence counter 84. The resulting absence of the RSTE$\phi$ signal at the output of OR circuit 101 enables an increment signal on the control point line 103 to be supplied by way of AND circuit 104 to the +1 terminal of the sequence counter 84. Thus, execute sequence counter 84 is incremented instead of being reset. This enables the sequence counter 84 to continue on beyond the repeat point to enable the execute decode PLA's 78 and 79 to produce the ending microwords for that particular processor instruction. Latch circuit 110 remains in a set condition until the occurrence of another processor instruction for which the microcode repeating action or looping action is to be provided. Upon occurrence of such a further processor instruction, the latch 110 is reset during the effective address segment of the microword sequence for such instruction. In particular, latch 110 is reset by the microword which produces an LRC load repeat counter signal on control point line 112, this LRC signal being supplied to the reset terminal (R) of the latch 110.

The microcode control mechanism of FIG. 2B further includes circuitry for loading into the repeat counter 108 a number value which determines the number of repetitions that will be allowed for the portion of the execute segment to be repeated. This circuitry includes a plural-bit bus 113, a plural-bit set of inverter circuits 114 and a plural-bit bus 115. The individual lines of bus 115 are connected to the different stages in the repeat counter 108 to enable the loading of a plural-bit binary number into the repeat counter 108 in a parallel manner. At the moment an LRC load repeat counter signal appears on the control point line 112, there is present on the processor bus 50 a binary number corresponding to the number of loops desired of the microword portion to be repeated. This number value is inverted by inverters 114 to load the repeat counter 108 with the one's complement of such number. Shortly thereafter and before commencement of the microword sequence portion to be repeated, the repeat counter 108 is incremented by one via control point line 109 to provide it with an initial count value corresponding to the two's complement of the loop count number that appeared on the processor bus 50. This enables the repeat counter 108 to produce an overflow signal when the desired number of microcode loops have been counted. Inverters 114 may be omitted if the lines of the bus 115 are connected to the stages of the repeat counter 108 in the appropriate manner to set the repeat counter 108 to the one's complement of the binary number appearing on the bus 113. As a further alternative, inverters 114 can be omitted and the one's complement can be produced directly on the processor bus 50 by the use of the ALU 60.

The loop count number for the initial loading of repeat counter 108 may be obtained from the user program residing in the main storage unit 40 (FIG. 2A). In the most general case, such loop count number would be fetched from main storage 40 and loaded into one of the general registers, for example, the general register 52. Thereafter, during the occurrence of the LRC load repeat counter signal on control point line 112, the register output gates 57 would be enabled to supply the loop count number by way of such gates 57, processor bus 50, bus 113, inverters 114 and bus 115 to the repeat counter 108.

Alternatively, the loop count number may be obtained from one of the microwords produced by effective address decode PLA's 72 and 73. In this regard, each microword is assumed to include a multiple-bit mask field which can be coded to provide a desired binary number value for the processor bus 50. These mask fields are supplied straight through by the A and B decoders 86 and 87 without modification. The mask field obtained from the A control register 88 is supplied to the processor bus 50 by way of bus 116, OR circuits 67 and gates 66, the latter two items being shown in FIG. 2A. The mask field of the microword in the B control register 92 is supplied to the processor bus 50 by way of bus 117, OR circuits 67 and gates 66.

If the loop count number is to be obtained from one of the microwords, then this microword can be the same microword which produces the LRC load repeat counter signal on control point line 112. This same microword would also produce a G10 control point signal to enable gates 66. This enables the loop count number contained in the mask field of such microword to be supplied by the appropriate one of buses 116 and 117, the OR circuits 67, the gates 66, the processor bus 50 and the bus 113 to the repeat counter 108.

OPERATION OF FIG. 2 EMBODIMENT

A typical sequence of operations for the data processor embodiment of FIGS. 2A-2C will now be described with the aid of the timing chart of FIG. 4. The abbreviations and legends used in FIG. 4 have the following meanings:

INSTR. = Instruction
CLK = Clock = active clock phase
MW = Microword
AA = Effective Address A decode PLA 72
AB = Effective Address B decode PLA 73
XA = Execute A decode PLA 78
XB = Execute B decode PLA 79
EA. SEQ. COUNT = Effective Address Sequence Counter 82
EX. SEQ. COUNT = Execute Sequence Counter 84

Figure 4:
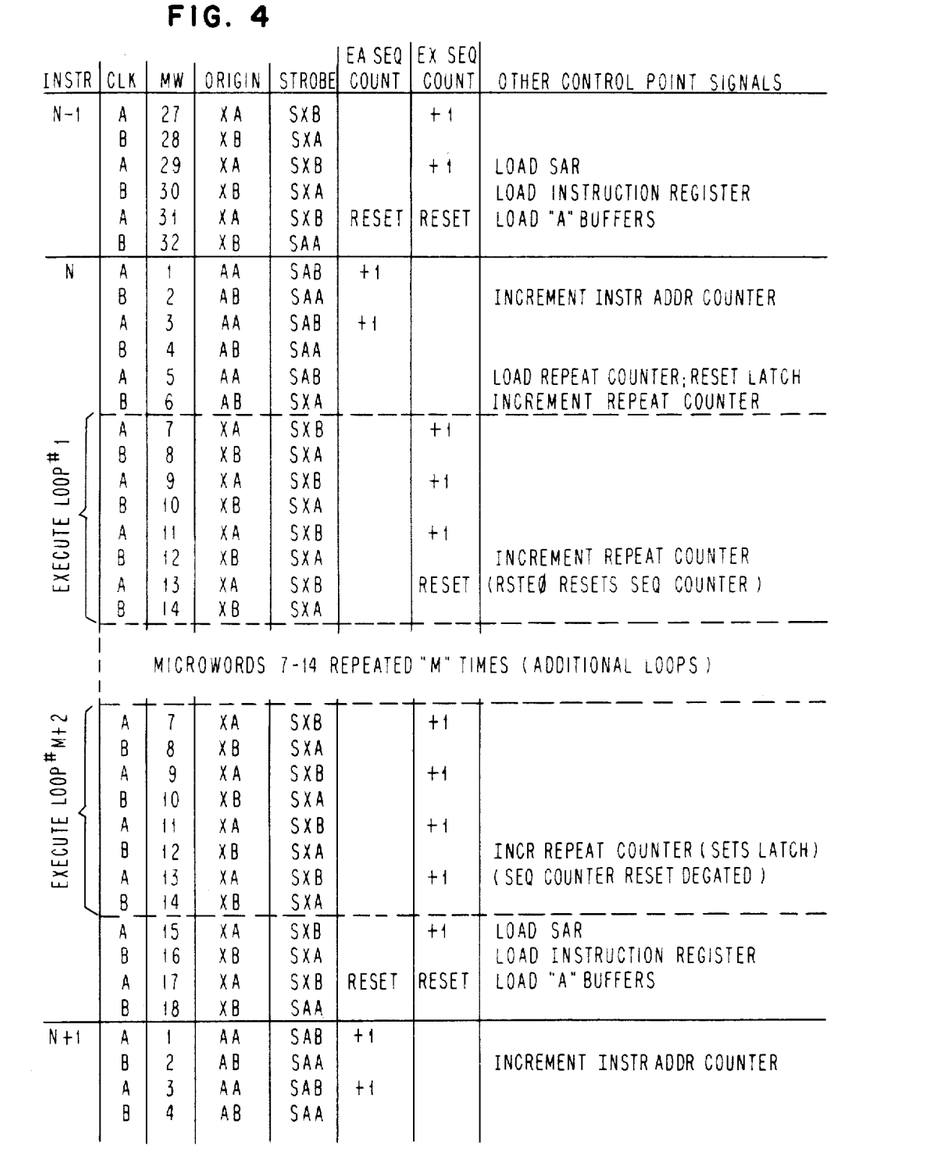
FIG. 4 is a timing chart used in explaining the operation of the microcode control mechanism of FIGS. 2B and 2C.

The "Other Control Point Signals" column in FIG. 4 is not intended to and does not show all the other control point signals generated for each microword. It lists only selected control point signals which are of particular interest with respect to the description to be given.

Instruction N represents a processor instruction resident in the instruction register 55 for which the microcode looping action is desired. Instruction N−1 denotes the processor instruction immediately preceding instruction N, while instruction N+1 denotes the processor instruction immediately following instruction N. Only the last few microwords of instruction N−1 and the first few microwords of instruction N+1 are represented in FIG. 4.

Microword 29 for instruction N−1, among other things, causes SAR 41 of FIG. 2A to be loaded with the address of the next instruction, namely, instruction N. This address is obtained from the instruction address counter 62 by way of gates 64 and the processor bus 50. This accesses the main storage 40 to cause a readout of instructions N.

Microword 30 for instruction N−1 causes the instruction being read out by the main storage unit 40 to be loaded into the instruction register 55. This is accomplished by enabling gates 42 by means of control point signal G1 and by activating the L7 control point signal for the instruction register 55. This L7 signal loads processor instruction N into the instruction register 55. This makes instruction N, or at least the effective operation code bits thereof, available to the encode PLA's 71 and 77 of FIG. 2B so that they can produce their respective instruction ID numbers.

Microword 31 for instruction N−1 causes a resetting to zero of both the effective address sequence counter 82 and the execute sequence counter 84. This microword 31 also causes the instruction ID numbers appearing at the outputs of encode PLA's 71 and 77 to be loaded into the A buffers 75 and 80, respectively. This resetting and loading is caused by activation of control point line 100 which comes from the output of A decoder 86. During the microword cycle for this microword 31, the effective address A decode PLA 72 is driven to produce at its output the microword specified by the processor ID number and the sequence count of zero.

During the microword cycle for microword 32 of instruction N−1, the microword (microword 1 for instruction N) appearing at the output of a decode PLA 72 is loaded into the A control register 88. This is accomplished by the presence of the SAA strobe signal at gates 89 and the presence of the B clock pulse at the load terminal of A control register 88. This microword 1 for instruction N in the A control register 88 then commences to drive the A decoder 86 to cause activation of the appropriate decoder output control point lines.

During this same microword 32 of instruction N−1, the instruction ID number for instruction N then residing in A buffer 75 is set into the B buffer 76. Likewise, the initial zero count in sequence counter 82 is set into the count buffer 83. This commences the accessing of the B decode PLA 73 for purposes of producing at the output thereof microword 2 for instruction N.

The next ensuing positive A clock interval enables A gates 91. This makes microword 1 of instruction N the active microword and places it in control of the data processor for one microword cycle, such cycle lasting for the duration of the positive A clock pulse which enables the A gates 91. This marks the beginning of the microword sequence for processor instruction N insofar as active control of the data processor is concerned.

Microwords 1-6 of instruction N represent the first or effective address segment of the microword sequence needed to execute instruction N. During this segment, the effective main storage address or addresses for the operand or operands are calculated and such effective address or addresses are loaded into an appropriate register or registers. Various internal housekeeping chores are also performed during this effective address segment of the overall microword sequence for instruction N. For example, microword 2, among other things, also causes the instruction address counter 62 to be incremented to provide therein the address of the next processor instruction, namely, the N+1 instruction. Microword 5 for instruction N activates the control point line 112 to load the repeat counter 108 and to reset the overflow latch 110. Microword 6 causes the repeat counter 108 to be incremented by a count of one to provide therein the two's complement of the loop count number. This is the desired initial count condition for the repeat counter 108.

Microword 7 for instruction N represents the first microword in the second or execute segment of the overall microword sequence for instructions N. The microwords in this execute segment are provided by the execute decode PLA's 78 and 79. The switching from the effective address decode PLA's 72 and 73 to the execute decode PLA's 78 and 79 is accomplished by the SXA strobe signal produced by microword 6, the last microword in the effective address segment. This SXA strobe signal enables gates 90 to enable the first microword in the execute segment, namely, microword 7, to be loaded into the A control register 88.

Microwords 7-14 for instruction N represent the selected portion of the microword sequence which it is desired to repeat. One of the microwords in this selected portion, in this example, microword 12, causes control point line 109 to be activated to increment the repeat counter 108. This marks the making of a first pass or first loop through the selected portion represented by microwords 7-14. Microword 13 for instruction N causes the control point line 105 to be activated to produce the RSTEφ signal which is supplied by way of AND circuit 106 and OR circuit 101 to reset the execute sequence counter 84 to a zero count condition. This same microword 13 also activates the control point line 103 to produce the XSEQ+1 increment signal for the sequence counter 84. This increment signal is, however, not effective because the RSTEφ signal at the output of OR circuit 101 disables the AND circuit 104 for the increment signal.

Resetting the sequence counter 84 to a count of zero causes the execute A decode PLA 78 to again produce the microword identified as microword 7 of instruction N. During microword 14 of the first pass, this microword 7 is loaded into the A control register 88. After completion of the cycle for the first pass microword 14, the following A clock pulse enables the A gates 91 to again place the microword 7 in control of the data processor. This marks the beginnning of the second pass or second loop for the selected microwords 7-14.

So long as no overflow pulse is produced by the repeat counter 108, the microword sequence represented by microwords 7-14 is repeated over and over again. The RSTEφ repeat signal produced near the end of each pass resets the execute sequence counter 84 to cause a further pass through the selected portion represented by microwords 7-14.

When the desired number of passes or loops have been completed, the repeat counter 108 produces an overflow pulse to set the latch 110. This disables the AND circuit 106 to prevent the RSTEφ repeat signal from causing any further resetting of the execute sequence counter 84. This termination of the repeat action is shown in the portion of FIG. 4 labelled as "Execute Loop #M+2". This loop represents the last pass through microwords 7-14. At microword 12 of this pass, the repeat counter 108 is incremented. This produces the overflow pulse which sets the latch 110. Thus, there is no resetting of the sequence counter 84 during the microword 13 because of the degating or disabling of the AND circuit 106 by the set condition of latch 110. Instead, during this microword 13, the increment signal XSEQ+1 on control point line 103 is allowed to pass through the AND circuit 104 to the increment terminal of sequence counter 84. This increments the sequence counter 84 to the value needed to produce microword 15.

Thereafter, the sequence counter 84 is incremented in the normal manner to produce the ending microwords 15-18 of the overall microword sequence for instruction N. Among other things, these ending microwords prepare the system for the processing of the next instruction N+1. In particular, the ending microword 15 loads the SAR 41 with the address of the next instruction N+1. Ending microword 16 transfers this next instruction N+1 from the main storage 40 to the instruction register 55. Ending microword 17 loads the instruction ID number of this instruction into the A buffers 75 and 80 and resets to zero the sequence counters 82 and 84. This gets the decode PLA's 72,73,78 and 79 started on the production of the microwords needed to perform this next instruction N+1.

An advantage of this improved microcode control mechanism is that both the starting point of the microcode portion to be repeated and the number of repeats can be varied from one type of instruction to another without need for additional circuitry to accommodate each of the different types of instructions. The starting point is controlled by the choice of the microword which cause the transition from the effective address segment to the execute segment of the overall microword sequence. Thus, the microprogrammer can readily select different starting points for different types of instructions. No additional hardware is required. The repeat circuitry sets the microword sequence back to the starting point of the execute segment without regard to the number of effective address microwords that may have occurred before this starting point.

The loop count number which is loaded into the repeat counter 108 to determine the number of repeats can be obtained from either the user program in main storage 40 or from the microprogram in decode PLA's 72,73,78 and 79. For a variable field length type of instruction where different numbers of repeats can be required for the same instruction, the loop count number is obtained from the user program. For fixed field length instructions where the loop count number will always be the same for any given such instruction, the loop count number can be included as part of the microcode for executing such instruction.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a microprogrammed data processor wherein a sequence of microwords are used to control execution of each processor instruction, an improved microcode control mechanism comprising:

instruction circuitry for providing a plural-bit instruction dependent signal indicating the processor instruction to be executed;

sequence counter circuitry for supplying a sequence of plural-bit number signals;

a programmable logic array mechanism jointly responsive to the instruction dependent signal and to the sequence of number signals for producing a sequence of microwords needed to execute the instruction;

repeat circuitry responsive to a predetermined microword for setting the sequence counter circuitry to a count which is less than a current count for causing a selected portion of the microword sequence to be repeated;

repeat control circuitry including a repeat counter for counting the number of times the selected portion of the microword sequence is repeated and for disabling the repeat circuitry after a predetermined number of such repeats;

and circuitry for loading into the repeat control circuitry a number value which determines the number of repeats that will be allowed for the selected portion of the microword sequence, said number value being variable with each occurrence of an instruction;

control circuitry responsive to the microwords from the programmable logic array for producing for each microword a plurality of control point signals for controlling operation of the data processor for one microword cycle;

the circuitry for loading the repeat control circuitry includes circuitry responsive to a predetermined control point signal produced by a predetermined microword occurring before occurrence of the selected portion of the microword sequence for loading the repeat counter with an initial count value;

the repeat circuitry includes circuitry responsive to a predetermined control point signal produced by a predetermined microword in the selected portion of the microword sequence for supplying a repeat signal to the sequence counter circuitry to a count which initiates the repeating of the selected portion of the microword sequence;

repeat control circuitry includes circuitry responsive to a predetermined control point signal produced by a predetermined microword in the selected portion of the microword sequence for changing by a fixed amount the number value in the counter;

and the repeat control circuitry includes output circuitry responsive to a predetermined number value in the repeat counter for disabling the supplying of the repeat signal to the sequence counter circuitry.

2. An improved microcode control mechanism in accordance with claim 1 wherein:

the data processor includes a main storage unit for storing a instructions comprising the user program to be performed;

the instruction circuitry includes a plural-bit instruction register for receiving from the main storage unit at least an operation code part of the processor instruction to be executed;

and the instruction circuitry further includes circuitry coupled to the instruction register for providing the plural-bit instruction dependent signal representing the processor instruction to be executed.

3. An improved microcode control mechanism in accordance with claim 1 wherein the sequence counter circuitry includes a plural-bit binary counter for supplying the sequence of plural-bit number signals, such number signals being plural-bit binary number signals.

4. An improved microcode control mechanism in accordance with claim 1 wherein the programmable logic array mechanism includes at least one programmable logic array having an input AND array connected by multiple word lines to an output OR array, with the input AND array being responsive to the instruction dependent signal and to the sequence of number signals for causing the output OR array to produce at least some of the microwords needed to execute the processor instruction.

5. An improved microcode control mechanism in accordance with claim 1 wherein the programmable logic array mechanism includes:

a plurality of programmable logic arrays for individually producing different ones of the microwords needed to execute the processor instruction;

and multiplexer circuitry coupled to the outputs of the programmable logic arrays for enabling microwords from different programmable logic arrays to take turns in controlling the operation of the data processor.

6. An improved microcode control mechanism in accordance with claim 1 wherein:

the data processor includes a main storage unit for storing a instructions comprising the user program to be performed;

and the circuitry for loading the repeat control circuitry includes circuitry for extracting from the user program in the main storage unit a programmed number value and loading such number value into the repeat control circuitry to establish the number of repeats that will be allowed for the selected portion of the microword sequence.

7. An improved microcode control mechanism in accordance with claim 1 wherein the circuitry for loading the repeat control circuitry includes circuitry for extracting from a microword occurring before the selected portion of the microword sequence a microprogrammed number value and loading such number value into the repeat control circuitry to establish the number of repeats that will be allowed for the selected portion of the microword sequence.

8. An improved microcode control mechanism in accordance with claim 1 wherein:

the microcode control mechanism includes decoder circuitry responsive to the microwords from the programmable logic array mechanism for producing for each microword a plurality of control point signals for controlling operation of a data processor for one microword cycle;

and the repeat circuitry includes circuitry responsive to a predetermined control point signal produced by a predetermined microword in the selected portion of the microword sequence for supplying a reset signal to the sequence counter circuitry for resetting the sequence counter circuitry back to a count which initiates the repeating of the selected portion of the microword sequence.

9. An improved microcode control mechanism in accordance with claim 1 wherein:

the microcode control mechanism includes decoder circuitry responsive to the microwords from the programmable logic array mechanism for producing for each microword a plurality of control point signals for controlling operation of the data processor for one microword cycle;

the programmable repeat control circuitry includes circuitry responsive to a predetermined control point signal produced by a predetermined microword in the selected portion of the microword sequence for incrementing the repeat counter;

and the programmable repeat control circuitry further includes circuitry responsive to occurrence of a predetermined count in the repeat counter for disabling the repeat circuitry to prevent any further repeat of the selected portion of the microword sequence.

10. In a microprogrammed data processor wherein a sequence of microwords are used to control execution of each processor instruction, an improved microcode control mechanism comprising:

first and second programmable logic array mechanisms responsive to the processor instruction to be executed for respectively producing microwords for first and second segments of the microword sequence needed to execute the instruction;

first and second sequence counter mechanisms for respectively driving the first and second programmable logic array mechanisms for enabling them to produce their respective segments of the microword sequence;

repeat circuitry responsive to a predetermined microword from the second programmable logic array mechanism for resetting the second sequence counter mechanism for causing a selected portion of the second segment of the microword sequence to be repeated;

repeat control circuitry including a repeat counter for counting the number of times the selected portion of the second segment of the microword sequence is repeated and for disabling the repeat circuitry after a predetermined number of such repeats;

and circuitry for loading into the repeat control circuitry a number value which determines the number of repeats that will be allowed for the selected portion of the second segment of the microword sequence, said number value being variable with each occurrence of an instruction;

control circuitry responsive to the microwords from the programmable logic array mechanism for producing for each microword a plurality of control point signals for controlling operation of the data processor for one microword cycle;

the circuitry for loading the repeat control circuitry includes circuitry responsive to a predetermined control point signal produced by a predetermined microword occurring before occurrence of the selected portion of the microword sequence for loading the repeat counter with an initial counter value;

the repeat circuitry includes circuitry responsive to a predetermined control point signal produced by a predetermined microword in the selected portion of the microword sequence for supplying a repeat signal to the second sequence counter mechanism for setting the second sequence counter mechanism to a count which initiates the repeating of the selected portion of the microword sequence;

the repeat control circuitry includes circuitry responsive to a predetermined control point signal produced by a predetermined microword in the selected portion of the microword sequence for changing by a fixed amount the number value in the counter;

and the repeat control circuitry includes output circuitry responsive to a predetermined number value in the repeat counter for disabling the supplying of the repeat signal to the second sequence counter mechanism.

11. An improved microcode control mechanism in accordance with claim 10 and further including circuitry responsive to a first segment ending microword from the first programmable logic array mechanism for enabling the second programmable logic array mechanism to produce the microwords of the second segment.

12. An improved microcode control mechanism in accordance with claim 11 wherein:

the data processor includes a main storage unit for storing the instructions comprising the user program to be performed;

and the circuitry for loading the repeat control circuitry includes circuitry for extracting from the user program in the main storage unit a programmed number value and loading such number value into the repeat control circuitry for establishing the number of repetitions that will be allowed for the selected portion of the second segment of the microword sequence.

13. An improved microcode control mechanism in accordance with claim 10 wherein the circuitry for loading the repeat control circuitry includes circuitry for extracting from a microword occurring during the first segment of the microword sequence a microprogrammed number value and loading such number value into the repeat control circuitry to establish the number of repeats that will be allowed for the selected portion of the second segment of the microword sequence.

* * * * *